US012673798B2

(12) United States Patent
Ding

(10) Patent No.: US 12,673,798 B2
(45) Date of Patent: Jul. 7, 2026

(54) CORRUGATED PAPER CUP

(71) Applicant: Kraftpack (Hubei) Industrial Co., Ltd., Jingmen (CN)

(72) Inventor: Jiaoping Ding, Jingmen (CN)

(73) Assignee: Kraftpack (Hubei) Industrial Co., Ltd., Jingmen (CN)

( * ) Notice: Subject to any disclaimer, the term of this patent is extended or adjusted under 35 U.S.C. 154(b) by 144 days.

(21) Appl. No.: 18/192,931

(22) Filed: Mar. 30, 2023

(65) Prior Publication Data

US 2023/0415948 A1     Dec. 28, 2023

(30) Foreign Application Priority Data

Jun. 27, 2022     (CN) .......................... 202210732384.0

(51) Int. Cl.
| | |
|---|---|
| *B65D 3/22* | (2006.01) |
| *B32B 7/12* | (2006.01) |
| *B32B 29/00* | (2006.01) |
| *B32B 29/08* | (2006.01) |
| *B65D 3/04* | (2006.01) |
| *B65D 3/30* | (2006.01) |
| *B65D 81/38* | (2006.01) |

(52) U.S. Cl.
CPC .................. *B65D 3/22* (2013.01); *B32B 7/12* (2013.01); *B32B 29/005* (2013.01); *B32B 29/08* (2013.01); *B65D 3/04* (2013.01); *B65D 3/30* (2013.01); *B65D 81/3865* (2013.01); *B32B 2307/7265* (2013.01); *B32B 2439/02* (2013.01)

(58) Field of Classification Search
CPC ... B65D 3/22; B65D 81/3865; B65D 81/3869
USPC .................... 229/400–405; 220/62.11, 62.12
See application file for complete search history.

(56) References Cited

U.S. PATENT DOCUMENTS

| | | | | |
|---|---|---|---|---|
| 2,550,520 A | * | 4/1951 | Bennett .................. | B65D 31/02 |
| | | | | 138/DIG. 6 |
| 4,117,971 A | * | 10/1978 | Itoh .......................... | B65D 3/22 |
| | | | | 229/941 |
| 5,363,982 A | | 11/1994 | Sadlier | |

(Continued)

FOREIGN PATENT DOCUMENTS

| | | |
|---|---|---|
| CN | 201048795 Y | 4/2008 |
| CN | 207917374 U | 9/2018 |

(Continued)

*Primary Examiner* — Nathan J Newhouse
*Assistant Examiner* — Nina K Attel
(74) *Attorney, Agent, or Firm* — Westbridge IP LLC

(57) ABSTRACT

Disclosed is a double-layer corrugated paper cup applicable to unmanned full-automatic manufacturing. The corrugated paper cup comprises a cup body formed by rolling a fan-shaped sheet, the fan-shaped sheet having a first edge and a second edge, a first end of the single-layer corrugated paper is staggered with and parallel to a first end of the inner cup paper and a second end of the single-layer corrugated paper is flush with a second end of the inner cup paper, a rolled rim a region of the fan-shaped sheet close to the upper arc edge is flattened to form an upper rim rolling region and a thickness of the upper rim rolling region is smaller than that of a middle part of the fan-shaped sheet and a part of the upper rim rolling region is rolled outwardly to form a rolled rim.

5 Claims, 7 Drawing Sheets

(56) References Cited

U.S. PATENT DOCUMENTS

| | | | |
|---|---|---|---|
| 5,685,480 A * | 11/1997 | Choi | B65D 3/22 |
| | | | 229/103.11 |
| 5,697,550 A | 12/1997 | Varano et al. | |
| 5,769,311 A | 6/1998 | Morita et al. | |
| 6,253,995 B1 | 7/2001 | Blok et al. | |
| 6,257,485 B1 | 7/2001 | Sadlier et al. | |
| 7,767,049 B2 * | 8/2010 | Sadlier | B65D 65/403 |
| | | | 156/212 |
| 2006/0196293 A1 | 9/2006 | Gerhardt | |
| 2006/0196923 A1 | 9/2006 | Tedford | |
| 2011/0174872 A1 | 7/2011 | Hsieh | |

FOREIGN PATENT DOCUMENTS

| | | | |
|---|---|---|---|
| CN | 215323798 U | 12/2021 | |
| CN | 215399872 U | 1/2022 | |
| JP | 2001002051 A | 1/2001 | |
| JP | 2009007021 A | 1/2009 | |
| WO | 2019036763 A1 | 2/2019 | |

* cited by examiner

CORRUGATED PAPER CUP

CROSS-REFERENCE TO RELATED APPLICATIONS

This application claims priority under 35 U.S.C.119 to Chinese Patent Application No. 202210732384.0, filed on Jun. 27, 2022, the content of which is incorporated herein by reference in its entirety.

TECHNICAL FIELD

The present application belongs to the technical field of paper cups, and relates to a paper cup, and particularly to a double-layer corrugated paper cup applicable to unmanned full-automatic manufacturing.

BACKGROUND

With the enhancement of people's awareness of environmental protection, a paper cup, as a daily necessity to replace a plastic cup, has become more and more popular, and has become a daily necessity in family, restaurant and office. For example, a corrugated paper cup with heat insulation and scalding resistance is a popular paper cup product, while it is a technical problem to be solved to provide a corrugated paper cup structure capable of being applicable to an unmanned automatic production line.

An existing corrugated cup mainly has two structures. According to a first structure, a corrugated paper sleeve is sheathed on an outer side of an inner paper cup. Since a corrugated gap cannot be kept due to extension of a single-layer corrugation, in order to keep the corrugated gap of the corrugated paper sleeve to exert an anti-scalding effect, a wavy single-layer corrugation is adhered to a layer of non-extensible backing paper first, and then the corrugated paper sleeve is made. After the corrugated paper sleeve is sheathed on an outer side of the paper cup, the backing paper of the corrugated paper sleeve is adhered and fixed to the paper cup. The corrugated paper cup with this structure can realize whole-process unmanned automatic manufacturing. The inner paper cup and the corrugated paper sleeve are automatically manufactured respectively, and then sheathed together by a sheathing machine. Due to the corrugated backing paper, the corrugated paper cup has a thick structure, wastes paper, employs a split manufacturing technology, needs many process equipment, and has a long technological process.

According to a second structure, single-layer corrugated paper is internally arranged between inner-layer paper and outer-layer paper, and under the support of the single-layer corrugated paper, a heat insulation gap is formed between the inner-layer paper and the outer-layer paper, and a sufficient paper strength is realized. Then, the inner-layer paper, the corrugated paper and the outer-layer paper are made into a fan-shaped sheet, two edges of the fan-shaped sheet are sealed and adhered to form a sealed seam, and a cup rim is rolled. Since the corrugated paper is flexible and has a corrugated gap occupying a large space, it is difficult to achieve a sealed and water-tight state during edge sealing, so that the wavy corrugated paper will be excluded from the edge sealing structure during edge sealing, and when the cup rim is rolled, it is also difficult to roll the corrugated paper, so that the wavy corrugated paper is excluded from the rim rolling. Therefore, it is very difficult to realize unmanned automatic manufacturing of the corrugated paper cup with this structure, because the wavy corrugation is difficult to treat during edge sealing and rim rolling.

SUMMARY

The present application is intended to provide a corrugated paper cup aiming at the above problems in the prior art, and the technical problem to be solved by the present application is to provide a simplified corrugated paper cup applicable to unmanned automatic manufacturing.

The objective of the present application can be achieved by the following technical solution: a corrugated paper cup comprises a cup body formed by rolling a fan-shaped sheet, and the fan-shaped sheet comprises inner cup paper and single-layer corrugated paper adhered to an outer peripheral surface of the inner cup paper, wherein a first end of the corrugated paper is staggered with and parallel to a first end of the inner cup paper, so as to form a first edge of the fan-shaped sheet, a second end of the corrugated paper is flush with a second end of the inner cup paper, so as to form a second edge of the fan-shaped sheet, a corrugated strip of the fan-shaped sheet after being unfolded is a transverse stripe in a direction from the first edge to the second edge, when the fan-shaped sheet is rolled to form a sealed seam, the second edge and the first edge of the fan-shaped sheet are laminated to form an seam region in which at least three layers of papers are adhered, a region of the fan-shaped sheet close to the upper arc edge is flattened to form an upper rim rolling region, a thickness of the upper rim rolling region is smaller than that of a middle part of the fan-shaped sheet, and a part of the upper rim rolling region is rolled outwardly to form a rolled rim.

As an improvement, an upper end of the single-layer corrugated paper close to the upper arc edge is flush with an upper end of the inner cup paper close to the upper arc edge, an lower end of the single-layer corrugated paper close to the lower arc edge is flush with an lower end of the inner cup paper close to the lower arc edge; a region of the fan-shaped sheet close to the lower arc edge is flattened to form a lower folding region and a thickness of the lower folding region is smaller than that of the middle part of the fan-shaped sheet, and a part of the lower folding region is folded inwardly to form a cup pedestal.

In the solution, the single-layer corrugated paper is directly adhered to the inner cup paper, so that the structure of the cup body becomes simple, and a structural design that the inner cup paper and the corrugated paper are separated at the first edge is used, and the inner cup paper is made of a waterproof material, so that the main body can be sealed by completely depending on the adhering portion of the inner cup paper, thus preventing water leakage. On this basis, in the solution, the corrugated strip is the transverse stripe in the direction along the first edge to the second edge, so that, on one hand, an anti-scalding effect is achieved, and on the other hand, an appearance after rolling is an upwardly spiral stripe due to the transverse stripe, and a ring-like supporting structure is formed, thus enhancing a structural strength. Moreover, a cup rim and a cup bottom are both rolled into the flattened corrugation, strengths of the cup rim and the cup bottom are enhanced, the second edge and the first edge of the fan-shaped sheet are laminated to form the seam region in which at least three layers of papers are adhered, the seam region is extruded to form a structure equivalent to a supporting beam, and an overall strength of the paper cup is higher than that of a common double-layer paper cup.

Secondly, with forward pulling of a roller shaft during manufacturing, paper used for manufacturing a corrugation has been stretched in a length direction of pulling progress of the paper due to influences of fine fiber arrangement and pulling and stretching, with a very small extensibility, so that the corrugation of the transverse stripe perpendicular to a pulling progress direction of the paper is pressed on the paper, which means that, the corrugated strip of the fan-shaped sheet after being unfolded is the transverse stripe in the direction along the first edge to the second edge, the first end of the corrugated paper is parallel to and staggered with the first end of the inner cup paper, after the transverse stripe is formed by this structure and the transverse stripe is flattened and rolled into the rolled rim, not only a strength of the rolled rim can be enhanced, but also the rolled rim is avoided from being broken, because a certain degree of paper extensibility is needed during rim rolling, and the extruded corrugation of the transverse stripe meets an extensibility requirement, so that the corrugation of the transverse stripe has a certain extensibility even if the corrugation has not been stretched in a transverse direction, thus meeting a structural requirement that a simplified structure is applicable to unmanned manufacturing, and also improving the structural strength.

In the corrugated paper cup above, after the regions of the fan-shaped sheet close to the upper arc edge and the lower arc edge are flattened, folds are formed on the flattened corrugation and rolled into the rolled rim or the cup pedestal.

In the corrugated paper cup above, a thickness of the inner cup paper is greater than that of the corrugated paper. The corrugated paper cup has a double-layer structure with a thick interior and a thin exterior, which ensures a stiffness of the paper cup and enhances a connection strength of the paper cup.

In the corrugated paper cup above, a corrugation of the corrugated paper is a straight stripe, and the straight stripe is in a direction perpendicular to the first edge.

In the corrugated paper cup above, a corrugation of the corrugated paper is a transverse wavy stripe along the first edge to the second edge.

In the corrugated paper cup above, a corrugation of the corrugated paper is a discontinuous corrugated cavity transversely distributed along the first straight edge to the second inclined edge, which comprises a circle-dot corrugated cavity or a rectangular corrugated cavity.

In the corrugated paper cup above, the inner cup paper has an adhering portion which is not covered by the single-layer corrugated paper, and when the second end of the inner cup paper is adhered to an outer side surface of the first end of the corrugated paper, the seam region comprises a four-layer reinforced structure formed by the second end of the corrugated paper, the second end of the inner cup paper, the first end of the corrugated paper and the first end of the inner cup paper, and a three-layer water-tight structure formed by the second end of the corrugated paper, the second end of the inner cup paper and the adhering portion. By the overlapping mode, when the rolled rim is rolled and formed, the adhering portion and the inner cup paper are rolled at the rolled rim, the adhering portion of the rolled rim is more sealed and stable, and meanwhile, an edge sealing connection strength of a rim rolling region is enhanced after the rolled rim is rolled, so that connection between two ends of the paper cup is more sealed and stable, and not easy to be separated.

As an alternative solution, when the second end of the inner cup paper is only adhered to the adhering portion, the first end of the corrugated paper and the second end of the corrugated paper are aligned with each other or have a gap, and the seam region comprises a three-layer water-tight structure formed by the second end of the corrugated paper, the second end of the inner cup paper and the adhering portion. Although a strengthening effect is reduced, the strength can still be enhanced because the corrugation is also rolled into the rolled rim after extrusion.

In the corrugated paper cup above, a waterproof layer is arranged on an inner wall of the inner cup paper, and when the adhering portion is overlapped on an inner side surface of the second end of the inner cup paper to form sealed adhesive connection, one end of the waterproof layer is connected with a main body of the waterproof layer. One end of the waterproof layer is connected with the main body of the waterproof layer, thus preventing water from leaking between the adhering portion and the second end of the inner cup paper, and in an overlapping region, an end surface of the first end of the corrugated paper abuts against the waterproof layer, thus further improving a sealing performance of the overlapping region.

In the corrugated paper cup above, a glue layer is formed between the corrugated paper and the inner cup paper. In the overlapping region, one end of the glue layer abuts against the waterproof layer, thus improving the sealing performance and a connection strength of the overlapping region.

In the corrugated paper cup above, the paper cup further comprises a cup bottom, an adhering layer is arranged on the cup bottom, the lower arc edge of the fan-shaped sheet is extruded to form a lower folding region, an end portion of the lower folding region is bent inwardly to form a folding layer, and the adhering layer is hermetically adhered between the lower folding region and the folding layer. The folding layer makes the adhering portion and the second end of the inner cup paper also have a connection strength.

Compared with the prior art, the present application has the following advantages.

1. The double-layer paper cup has the double-layer structure with the thick interior and the thin exterior, while separate edge sealing is performed on the inner cup paper and the corrugated paper in the edge sealing structure, which completely depends on sealed seam sealing of the inner cup paper, the edge sealing structure is realized by adhering at least three layers, and a thicker sealed seam is changed by extrusion, so that a thickness of the upper rim rolling region in which the edge region is located is reduced, thus being suitable for mechanical automatic rim rolling. Since the edge sealing structure of at least three layers makes the paper cup have a sufficient supporting force and keeps the strength of the paper cup, a cup wall formed in the upper rim rolling region will not be deformed and bent.

2. Since the edge sealing structure of at least three layers is cross-stacked, a better adhering effect can be achieved after edge sealing, the seam region is not easy to be torn or detached, and an anti-tear or anti-detach effect is further improved through extrusion and rim rolling.

3. When the corrugated paper with the corrugated structure is used, the folds are formed on a hollow part of the corrugation due to the extrusion of the corrugation, and the folds are strengthened due to creases and multi-layer overlapping, thus achieving a better strength after rim rolling.

DETAILED DESCRIPTIONS OF THE EMBODIMENTS

The following are specific embodiments of the present application, and the technical solution of the present application is further described with reference to the drawings, but the present application is not limited to these embodiments.

First Embodiment

Figure 1:
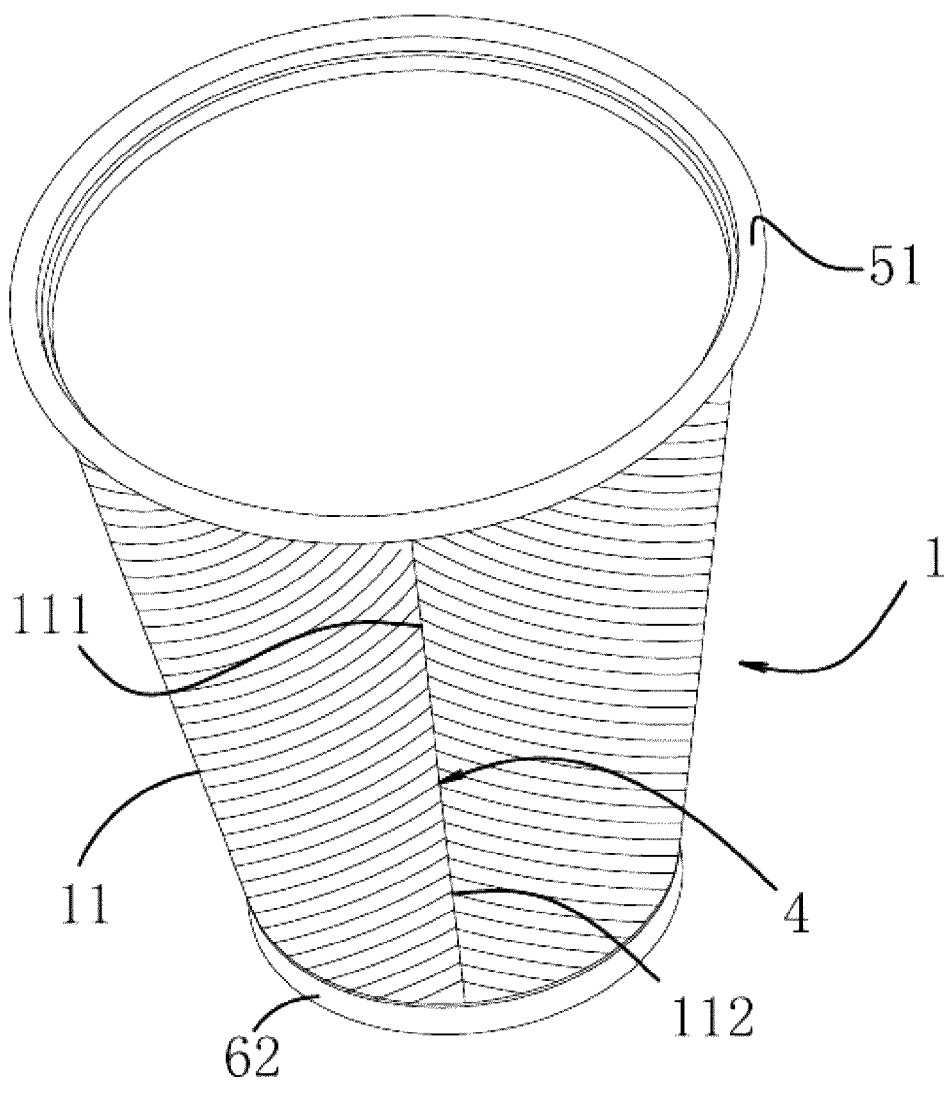
FIG. 1 is a stereoscopic diagram of First Embodiment of the present application.
Figure 5:
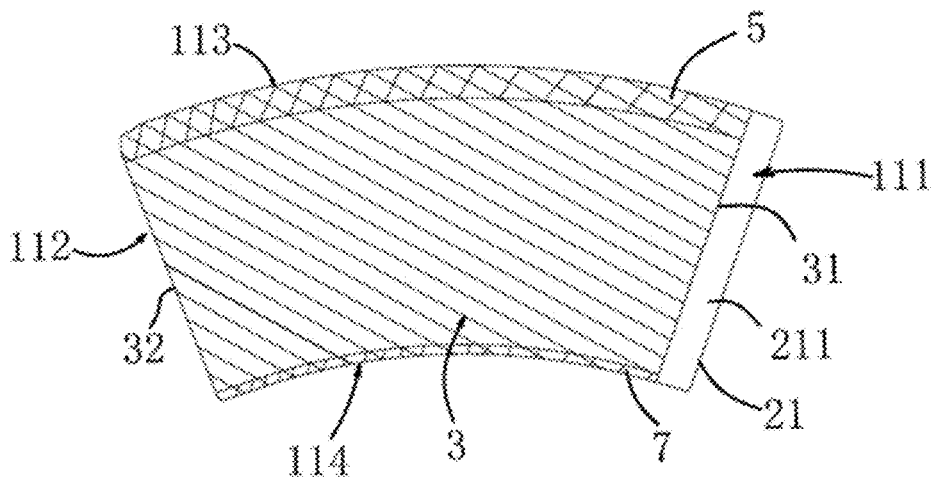
FIG. 5 is a schematic structural diagram of a double-layer paper cup of FIG. 1 after being fully unfolded.

As shown in FIG. 1 and FIG. 5, a paper cup 1 has a hollow flared cup structure, and comprises a cup body formed by rolling a fan-shaped sheet 11. The fan-shaped sheet 11 comprises a first edge 111, a second edge 112, an upper arc edge 113 and a lower arc edge 114. The first edge 111 and the second edge 112 are adhered to form an edge region 4. The paper cup 1 further comprises a rolled rim 51 and a cup bottom 6. An outer surface of the cup body is corrugated, the corrugated structure has anti-skid and anti-scalding functions, and the corrugated structure is joined at the seam region 4 of the paper cup 1, thus enhancing a structural strength of the paper cup 1.

Figure 2:
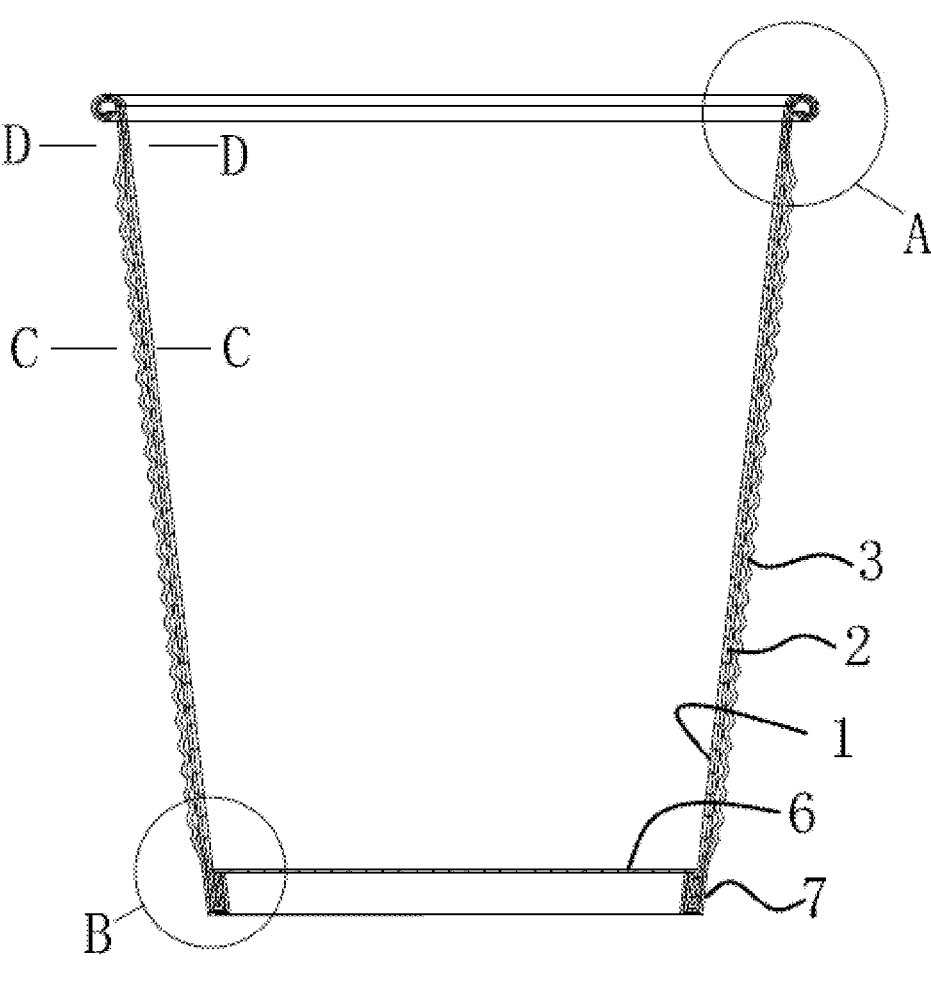
FIG. 2 is a schematic diagram of a semi-section of FIG. 1.

As shown in FIG. 2, the cup body consists of a waterproof layer 8, inner cup paper 2, a glue layer 9 and corrugated paper 3 from inside to outside. A thickness of the inner cup paper 2 is greater than that of the corrugated paper 3, so that the inner cup paper 2 is a main load-bearing structure, and the inner cup paper 2 can ensure a stiffness of the paper cup 1 and enhance a connection strength of the paper cup 1. The corrugated paper 3 has a corrugated structure of a transverse stripe, and a concave part of the corrugated structure of the corrugated paper 3 is adhered to the inner cup paper 2 through the glue layer 9. An upper rim rolling region 5 is arranged above the paper cup 1, and a bending region 7 is arranged below the paper cup 1. A thickness of the upper rim rolling region 5 is smaller than that of the cup body, and an upper part of the upper rim rolling region 5 is rolled to form the rolled rim 51. The rolled rim 51 facilitates enhancement of strength of the cup rim, and also facilitates drinking.

Figure 3:
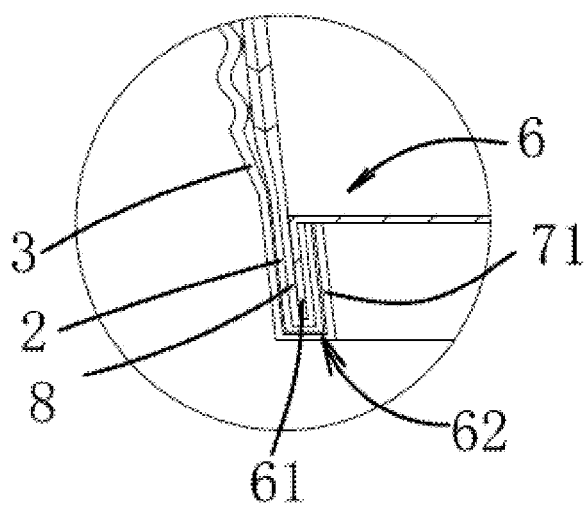
FIG. 3 is an enlarged view of a part B in FIG. 2.

Specifically, as shown in FIG. 3, an adhering layer 61 is arranged on the cup bottom 6, the lower folding region 7 is obtained by extruding the cup body, a folding layer 71 is formed by bending an end portion of the lower folding region 7, and the adhering layer 61 is placed between the lower folding region 7 and the folding layer 71 to be adhered and fixed, so that the cup bottom 6 is fixed on a main body of the paper cup 1. The adhering layer 61 is located between the lower folding region 7 and the folding layer 71 to support the cup bottom 6, so that connection between the cup bottom 6 and the main body of the paper cup 1 is more stable, and a sealing performance between the cup bottom 6 and the main body of the paper cup 1 is better, thus being not easy to leak water.

Figure 4:
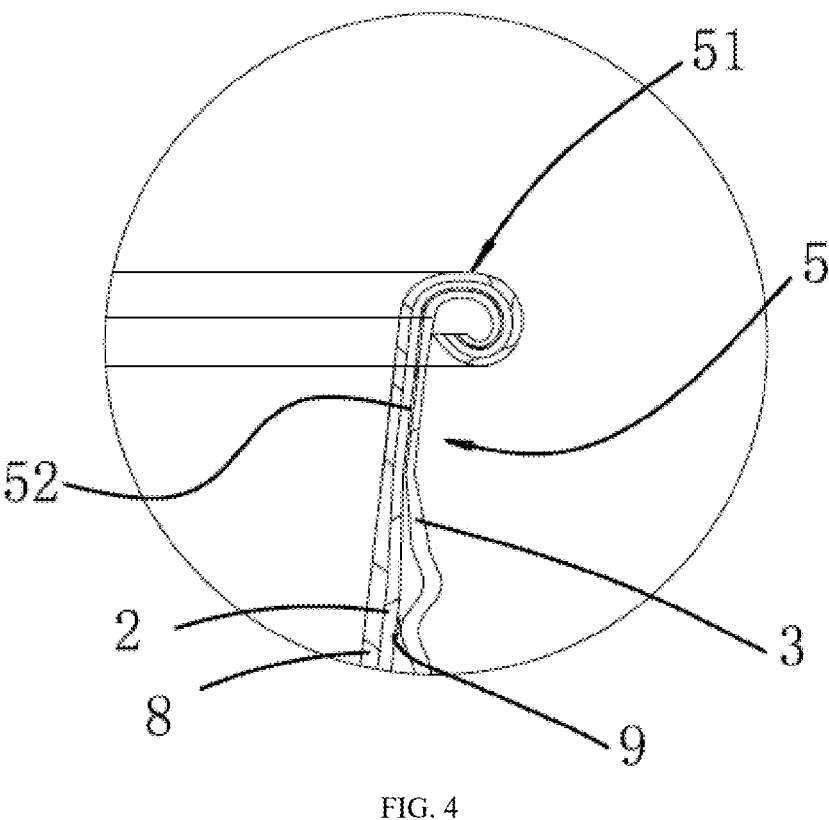
FIG. 4 is an enlarged view of a part A in FIG. 2.

As shown in FIG. 4, the upper rim rolling region 5 is obtained by extruding the cup body, an end portion of the upper rim rolling region 5 is rolled to form the rolled rim 51, and the rest part of the upper rim rolling region is a cup wall 52 of the cup body after extrusion. The cup wall 52 has sufficient strength due to multi-layer composition.

Figure 6:
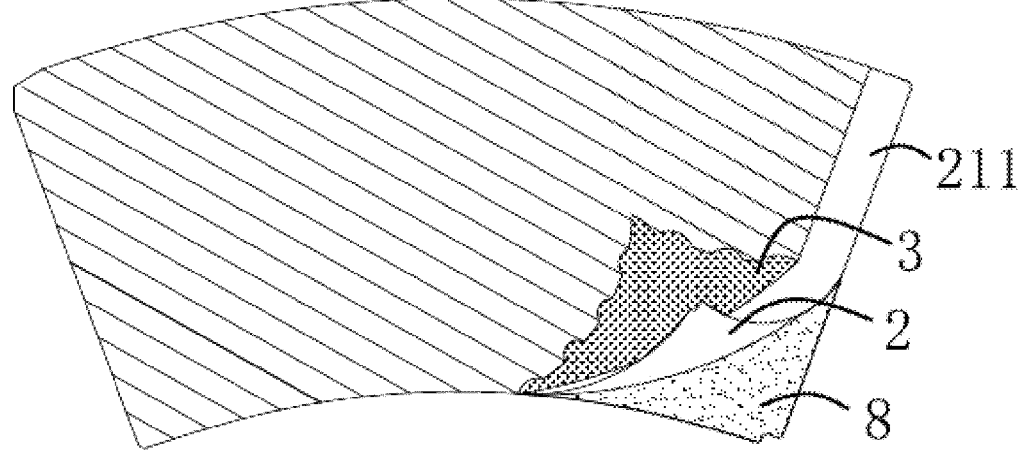
FIG. 6 is a schematic diagram of a multi-layer composite structure of a cup body of the double-layer paper cup before edge sealing.
Figure 11:
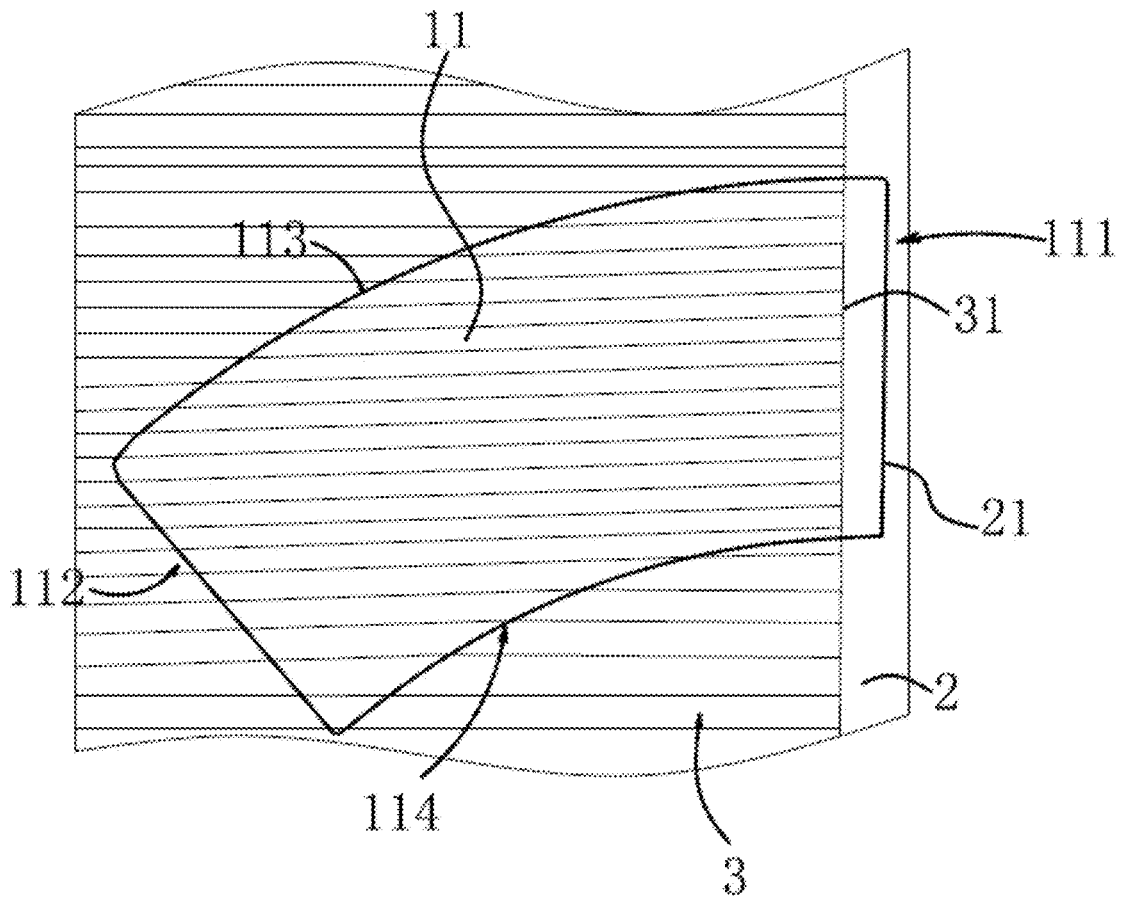
FIG. 11 is a diagram of a placement position of a fan-shaped sheet after cutting, which forms FIG. 5 after adjustment.

The fan-shaped sheet 11 is shown in FIG. 5, and after the molded paper cup is torn, the unfolded cup body is the fan-shaped sheet, which is cut from a sheet shown in FIG. 11. A specific process comprises: pressing a corrugation of a straight stripe on the paper 3, wherein the straight stripe is in a direction perpendicular to a pulling direction of the paper, then arranging an edge of the single-layer corrugated paper 3 to be staggered with and parallel to an edge of the inner cup paper 2, adhering and compounding the corrugated paper and the inner cup paper together by two composite rollers, then cutting a first end 21 of the inner cup paper to form a first edge 111 of the fan-shaped sheet 11, and cutting a second edge 112, an upper arc edge 113 and a lower arc edge 114 together with the first edge 111 to form the fan-shaped sheet 11 shown by a solid line in FIG. 11. In this way, unmanned automatic manufacturing may be realized. Therefore, as shown in FIG. 5 and FIG. 6, the corrugated paper 3 has a single-layer corrugated structure without backing paper, and the corrugated paper has a corrugation of a straight stripe, wherein the straight stripe is in a direction perpendicular to the first edge 111. The corrugation of the transverse stripe has a certain extensibility even if the corrugation has not been stretched in a transverse direction, thus meeting a structural requirement that a simplified structure is applicable to unmanned manufacturing. As an alternative solution, the corrugation of the corrugated paper is a transverse wavy stripe along the first edge to the second edge, which also meets a requirement of composite extensibility, or is replaced by a discontinuous corrugated cavity transversely distributed, which comprises a circle-dot corrugated cavity or a rectangular corrugated cavity.

The single-layer corrugated paper 3 is adhered to a fan-shaped outer peripheral surface of the inner cup paper 2, a fan-shaped length of the inner cup paper 2 is greater than that of the corrugated paper 3, and a first end 31 of the corrugated paper is staggered with and parallel to the first end 21 of the inner cup paper, so that the inner cup paper 2 has an adhering portion 211 which is not covered by the single-layer corrugated paper 3. An upper end of the single-layer corrugated paper close to the upper arc edge is flush with an upper end of the inner cup paper close to the upper arc edge, an lower end of the single-layer corrugated paper close to the lower arc edge is flush with an lower end of the inner cup paper close to the lower arc edge, and then the corrugated paper and the inner cup paper are extruded at the upper arc edge 113 to form the upper rim rolling region 5, and extruded at the lower arc edge 114 to form the lower folding region 7.

Figure 9:
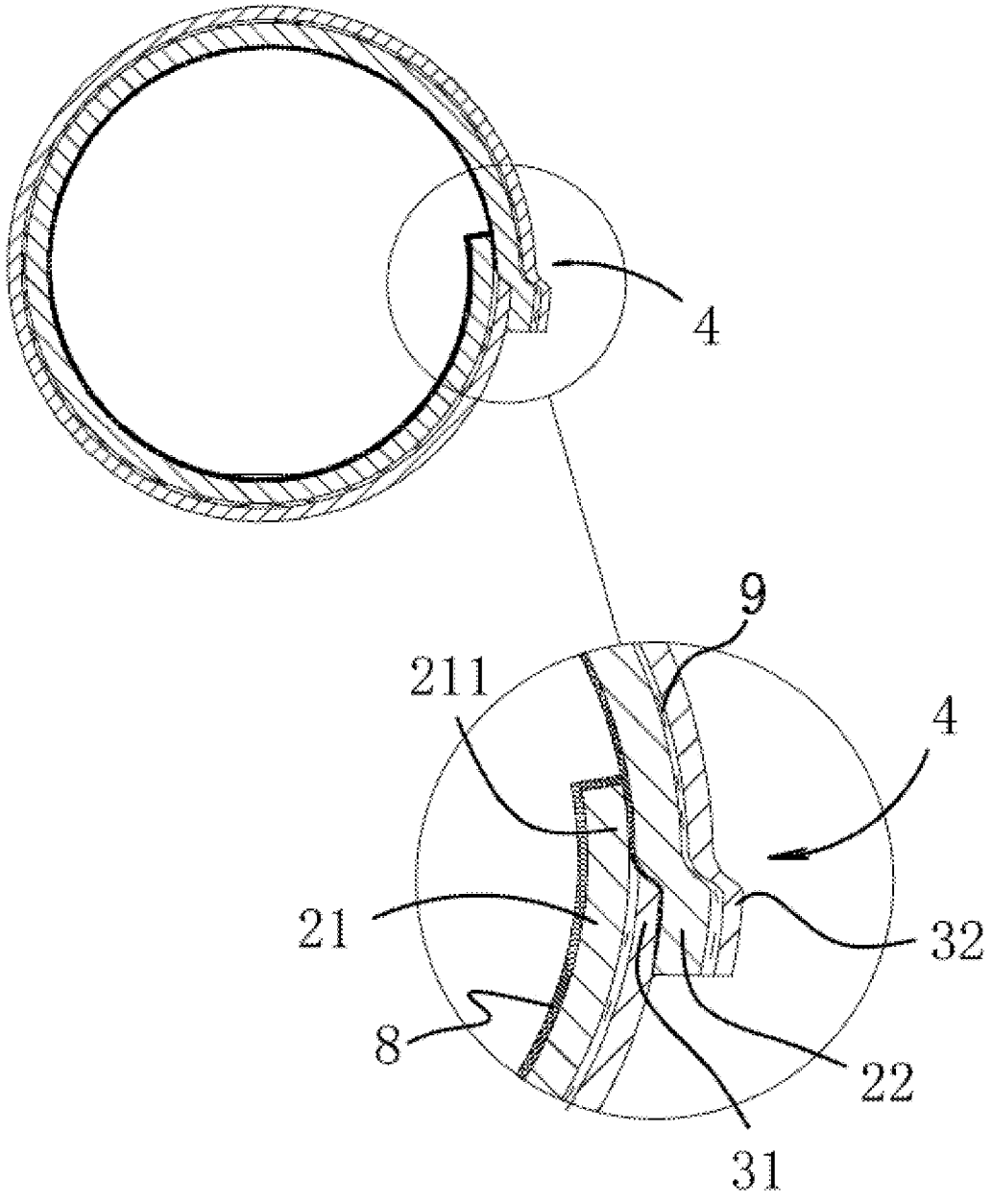
FIG. 9 is a schematic diagram of an enlarged structure of a joint part of the double-layer paper cup.

The state of FIG. 5 is obtained through FIG. 6 and FIG. 9. FIG. 6 shows a multi-layer structure of the cup body, comprising the waterproof layer 8, the inner cup paper 2 and the corrugated paper 3 respectively, wherein the waterproof layer 8 is located on an inner side of the paper cup 1, the waterproof layer 8 is adhesive, and adhered and fixed to the inner cup paper 2, and the waterproof layer 8 and the inner cup paper 2 have the same shape and size, so that an inner wall of the paper cup 1 is covered with the waterproof layer 8 after the paper cup 1 is folded and molded, thus ensuring the sealing performance of the paper cup 1. As shown in FIG. 9, through the state of FIG. 6, the fan-shaped sheet 11 is rolled and connected to form the seam region 4 shown in FIG. 9. Specifically, the first end 31 of the corrugated paper is overlapped with the second end 32 of the corrugated paper, and an overlapping position is staggered with the adhering portion 211. The seam region 4 comprises a four-layer reinforced structure formed by the second end 32 of the corrugated paper, the second end 22 of the inner cup paper, the first end 31 of the corrugated paper 3 and the first end 21 of the inner cup paper, and a three-layer water-tight structure formed by the second end 32 of the corrugated paper, the second end 22 of the inner cup paper and the adhering portion 211. The seam region 4 after adhesion is extruded to form a multi-layer reinforced layer, thus having a supporting beam function.

Figure 7:
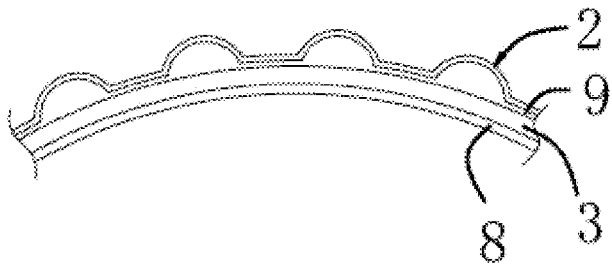
FIG. 7 is a schematic structural diagram of a cross-section of a part C-C in FIG. 2.
Figure 8:
FIG. 8 is a schematic structural diagram of a cross-section of a part D-D in FIG. 2, which is namely a schematic diagram of a specific structure of an upper rim rolling region of a cup rim of the double-layer paper cup after being compressed by the same thickness as the cross-section of the part C-C.

The fan-shaped sheet 11 in FIG. 6 is rolled and adhered to form the cup body, and a cross-section shape of the cup body is shown in FIG. 7. The glue layer 9 is also arranged between the inner cup paper 2 and the corrugated paper 3, the concave part of the corrugated paper 3 with the corrugated structure is adhered and fixed to the inner cup paper 2 through the glue layer 9, and a convex part of the corrugated paper 3 with the corrugated structure forms a heat insulation cavity. The structure of FIG. 6 is extruded in the upper rim rolling region 5 to form the extruded structure of FIG. 8. When the upper rim rolling region 5 is extruded, folds are formed on the convex part of the corrugated paper 3, and the folds enhance the strength of the upper rim rolling region 5, thus preventing the rolled rim 51 from being deformed during use. At the moment, a part of the upper rim rolling region 5 enhanced by the folds is rolled to form the rolled rim 51. The folds are rolled together into the rolled rim 51, and the rolled rim 51 has a good structural strength.

A principle of the solution is as follows: when the paper cup 1 is molded, the adhering portion 211 is overlapped with an inner side surface of the inner cup paper 2 first, and then the second end 22 of the inner cup paper is overlapped with the first end 31 of the corrugated paper, so that the paper cup 1 is transited evenly at a joint, thus avoiding the first end 31 of the corrugated paper from being directly connected with a main body of the inner cup paper 2. In an overlapping region 4, an end surface of the first end 31 of the corrugated paper abuts against the waterproof layer 8, and one end of the glue layer 9 abuts against the waterproof layer 8, thus improving a sealing performance and a connection strength of the overlapping region 4. When the rolled rim 51 and a cup pedestal 62 of the paper cup 1 are formed, there are many layers at the overlapping portion that are not easy to be rolled, so that the paper cup 1 is extruded to form the upper rim rolling region 5 and the lower folding region 7, and strength weakening caused by extrusion is compensated by the folds of the corrugated paper 3.

Second Embodiment

Figure 10:
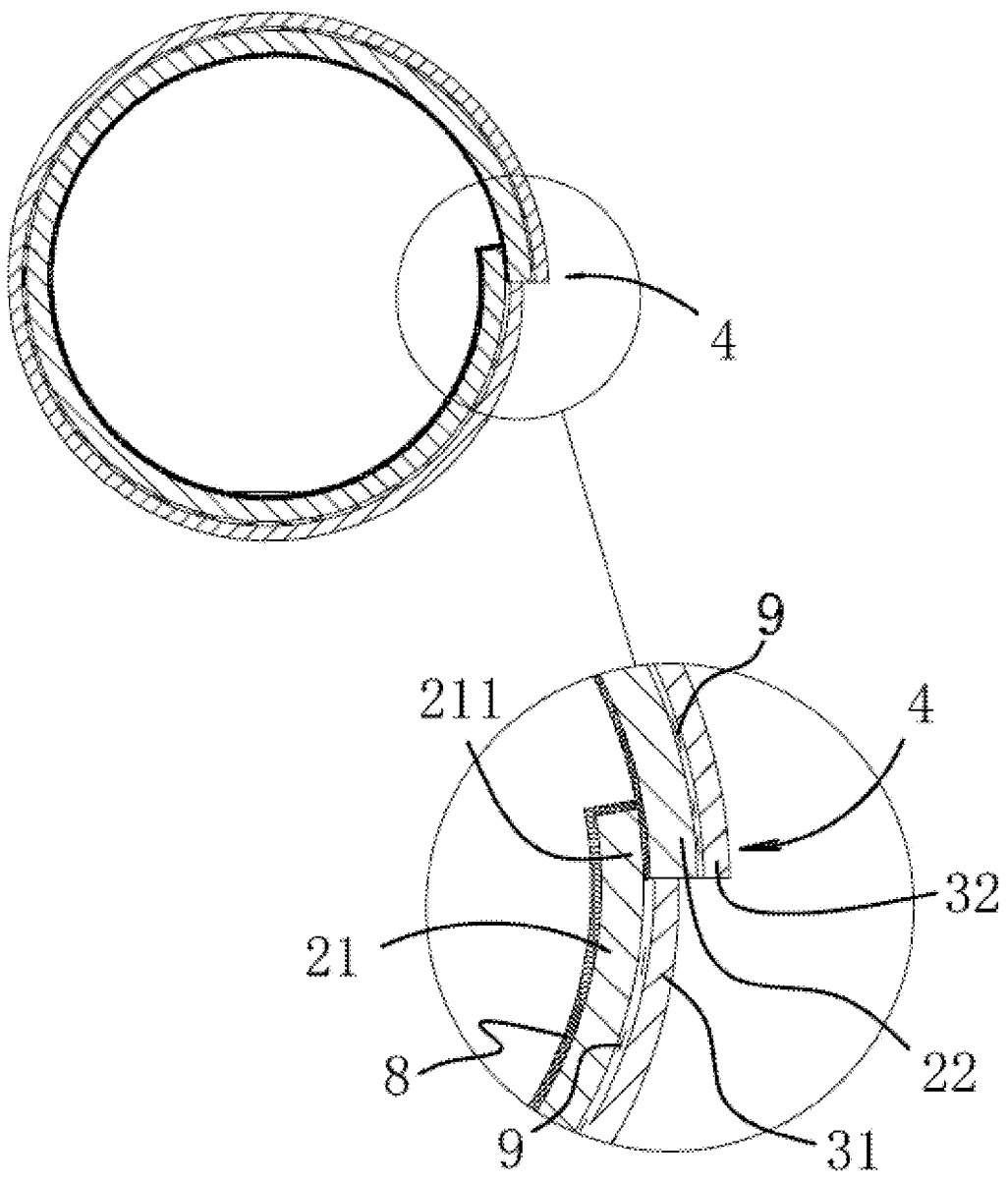
FIG. 10 is a schematic diagram of an enlarged structure of a joint part of a double-layer paper cup in Second Embodiment.

Second Embodiment is basically the same as First Embodiment, except that the seam region 4 is a connection structure. Specifically, as shown in FIG. 10, the first end 31 of the corrugated paper is connected with the second end 32 of the corrugated paper, and a connection position is located on one side of the adhering portion 211, or there is a gap between the first end 31 of the corrugated paper and the second end 32 of the corrugated paper. The seam region 4 consists of three layers formed by the second end 32 of the corrugated paper, the second end 22 of the inner cup paper and the adhering portion 211, and two layers formed the first end 31 of the corrugated paper and the first end 21 of the inner cup paper. Compared with the seam region 4 in First Embodiment, although a number of layers is reduced, there is still sufficient strength to maintain the strength of the upper rim rolling region 5, because the inner cup paper 2 is thick and has sufficient strength.

Third Embodiment

Third Embodiment is basically the same as First Embodiment or Second Embodiment, except that the corrugated paper 3 has a plane structure, and the corrugated paper is tin paper, plastic paper, silicone paper, glass paper or asphalt paper capable of being designed in various shapes. Because the inner cup paper 2 is thick, after the edge sealing structure is rolled together with outer-layer paper to form the rolled rim, there is still sufficient strength.

The specific embodiments described herein are merely illustrative to the scope of the present application. Those skilled in the technical field to which the present application belongs may make various modifications or supplements to the specific embodiments described or make substitutions in a similar way, without departing from the scope of the present application or exceeding the scope defined by the appended claims.

What is claimed is:

1. A corrugated paper cup, comprising:

a cup body formed by rolling a fan-shaped sheet, the fan-shaped sheet having a first edge, a second edge, an upper arc edge and a lower arc edge, and the fan-shaped sheet comprising only two layers of paper, wherein the only two layers of paper are respectively inner cup paper and single-layer corrugated paper adhered to an outer peripheral surface of the inner cup paper; wherein a first end of the single-layer corrugated paper is staggered with and parallel to a first end of the inner cup paper to form the first edge and a second end of the single-layer corrugated paper is flush with a second end of the inner cup paper to form the second edge of the fan-shaped sheet;

a thickness of the inner cup paper is greater than that of the single-layer corrugated paper;

a corrugated strip of the fan-shaped sheet unfolded is a transverse stripe in a direction from the first edge to the second edge; a corrugation of the single-layer corrugated paper is a straight stripe, and the straight stripe is in a direction perpendicular to the first edge;

when the fan-shaped sheet is rolled to form the cup body, the second edge and the first edge of the fan-shaped sheet are laminated to form a seam region;

the inner cup paper has an adhering portion which is not covered by the single-layer corrugated paper, when the second end of the inner cup paper is adhered to an outer side surface of the first end of the single-layer corrugated paper, the seam region comprises a four-layer reinforced structure formed by the second end of the single-layer corrugated paper, the second end of the inner cup paper, the first end of the single-layer corrugated paper and the inner cup paper adjacent the adhering portion, and a three-layer water-tight structure formed by the second end of the single-layer corrugated paper, the second end of the inner cup paper and the adhering portion; and a region of the fan-shaped sheet close to the upper arc edge is flattened to form an upper rim rolling region and a thickness of the upper rim rolling region is smaller than that of a middle part of the fan-shaped sheet and a part of the upper rim rolling region is rolled outwardly to form a rolled rim.

2. The corrugated paper cup according to claim 1, wherein an upper end of the single-layer corrugated paper close to the upper arc edge is flush with an upper end of the inner cup paper close to the upper arc edge, a lower end of the single-layer corrugated paper close to the lower arc edge is flush with a lower end of the inner cup paper close to the lower arc edge; a region of the fan-shaped sheet close to the lower arc edge is flattened to form a lower folding region and a thickness of the lower folding region is smaller than that of the middle part of the fan-shaped sheet, and a part of the lower folding region is folded inwardly to form a cup pedestal.

3. The corrugated paper cup according to claim 2, wherein after the region of the fan-shaped sheet close to the upper arc edge or/and the lower arc edge is flattened, folds are formed on the upper rim rolling region or/and the lower folding region, and the folds are rolled into the rolled rim or/and folded into the cup pedestal.

4. The corrugated paper cup according to claim 1, wherein a waterproof layer is arranged on an inner wall of the inner cup paper, and when the adhering portion is overlapped by an inner side surface of the second end of the inner cup paper to form a sealed adhesive connection, one end of the waterproof layer is connected with a main body of the waterproof layer.

5. The corrugated paper cup according to claim 4, wherein the paper cup further comprises a cup bottom, an adhering layer is arranged on the cup bottom, a region of the fan-shaped sheet close to the lower arc edge is flattened to form a lower folding region, an end portion of the folding region is folded inwardly to form a folding layer, and the adhering layer is hermetically adhered between the lower folding region and the folding layer.

\* \* \* \* \*